United States Patent
Plötscher et al.

[11] 3,800,175
[45] Mar. 26, 1974

[54] REVERSIBLE SYNCHRONOUS MOTOR

[75] Inventors: Hans Plötscher, Murten; Hermann Gerber, Courgevaux, both of Switzerland

[73] Assignee: SAIA A.G. Fabrik elektrischer Apparate, Fribourg Canton, Switzerland

[22] Filed: Oct. 17, 1972

[21] Appl. No.: 298,270

[30] Foreign Application Priority Data
Oct. 21, 1971   Switzerland...................... 15377/71

[52] U.S. Cl..................... 310/164, 310/191, 310/41
[51] Int. Cl. ............................................ H02k 21/12
[58] Field of Search ........................... 310/162–164, 310/172, 191, 209, 257, 41, 156, 66; 318/243

[56] References Cited
UNITED STATES PATENTS

| | | |
|---|---|---|
| 3,555,323 | 1/1971 | Gerber............................... 310/162 |
| 1,972,987 | 9/1934 | Gardeen ........................... 310/191 X |
| 3,614,495 | 10/1971 | Suzuki et al....................... 310/162 |
| 1,917,172 | 7/1933 | Warren............................... 310/164 |
| 2,437,142 | 3/1948 | Welch et al....................... 310/164 |
| 1,559,920 | 11/1925 | Stewart............................. 310/66 X |
| 2,081,993 | 6/1937 | Gebhardt et al.................. 310/164 |
| 2,146,603 | 2/1939 | Stephenson...................... 310/164 |
| 2,675,494 | 4/1954 | Ellis.................................. 310/191 X |
| 3,330,976 | 7/1967 | Brown............................... 310/191 |

*Primary Examiner*—D. F. Duggan
*Attorney, Agent, or Firm*—Imirie and Smiley

[57] ABSTRACT

A synchronous motor having at least one group of main stator poles and at least one group of shaded auxiliary stator poles, the relative position of said main poles and auxiliary poles and the phase shift of the magnetic flux in the auxiliary poles determining the rotating direction of the rotor. The stator is made in two parts whereof the one carries the main poles while the other carries the auxiliary poles, and these stator parts may be rotated relatively to each other by an electrical angle corresponding to double the phase shift of the flux in the auxiliary poles, in order to preselect the rotating direction of the rotor.

13 Claims, 3 Drawing Figures

REVERSIBLE SYNCHRONOUS MOTOR

The present invention concerns a small synchronous motor with a preselected direction of rotation. Preselection of the direction of rotation of the motor is desirable in many cases and offers various advantages. For example, the motor need not be symmetrical, i.e., with a shaft projecting from both sides but can be mounted with the shaft projecting at one side only.

Despite these advantages of pre-selected direction of rotation, such motors are little known in practice. In the case of a known motor, comprising a coil disposed non-coaxially to the rotor, bearing flanges with main poles are secured by screws to the pole yoke of the motor and, when the screws are loosened, are displaceable through twice the phase angle $\phi$ of the auxiliary flux. This embodiment is complicated both in its design and with regard to changing the direction of rotation. With this embodiment it is difficult to set the bearings exactly and properly in alignment, despite the adjustability of the bearing flanges.

It is an object of the present invention to provide a small synchronous motor which is simple from the point of view of design and the pre-selection of the desired direction of rotation.

According to the present invention there is provided a synchronous motor the stator of which is provided with main poles and auxiliary poles for determining the direction of rotation, all the poles of one kind being capable of being jointly displaced through twice the phase angle $\phi$ of the flux of the auxiliary poles relatively to the other kind of poles, to preselect the direction of rotation, wherein the displaceable poles are arranged on stator members coupled mechanically together, said stator members being rotatable co-axially with the rotor shaft in a stator housing carrying the rotor bearings and coupled to a common adjusting member accessible from outside the stator housing.

The parts of the stator which are rotatable in the stator housing can be easily adjusted without having to loosen any screws and tighten them again, and without the precise position and alignment of the rotor bearings being affected during the adjustment. Therefore the only demand on the bearing arrangement of the stator parts is that it should maintain admissible tolerances in the width of the air gap between the rotor and the stator poles. The operating positions of the adjustable parts of the stator may be denoted by catches or stops.

The construction of a small synchronous motor according to the present invention makes it possible to locate the adjustable parts of the stator in the stator housing, together with the field coil. Thus a simple construction and an easy selection of the direction of rotation by only one adjusting movement of the coil and the displaceable parts of the stator connected thereto, are possible. Although two stator parts are used, they can be energised by only one coil common to both.

The accompanying drawings show an embodiment of a synchronous motor according to the present invention. In the drawings, FIG. 1 is an axial section through a motor.

Figure 2:
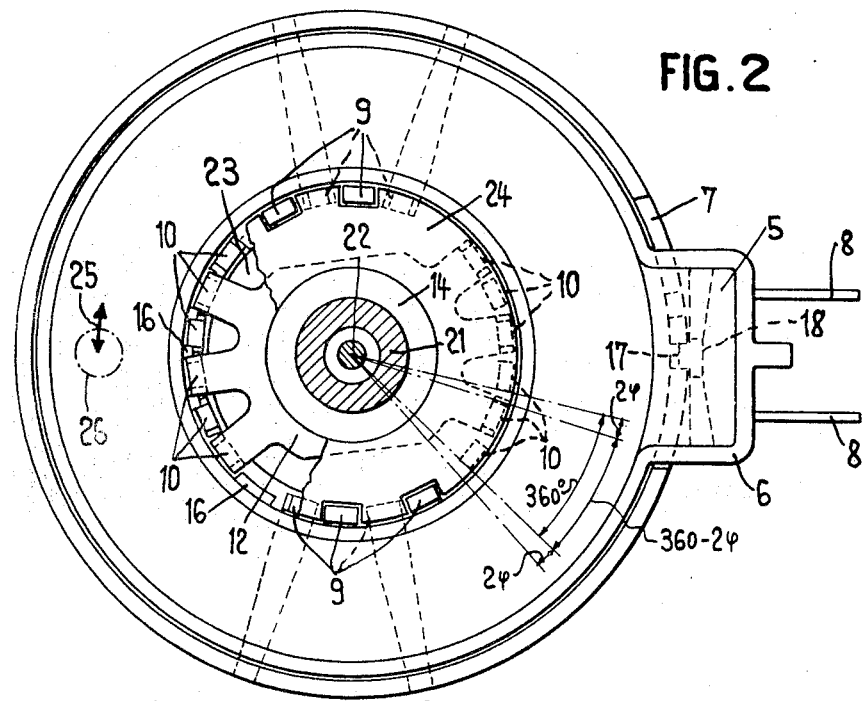
FIG. 2 is a side view with the stator cover removed.
Figure 3:
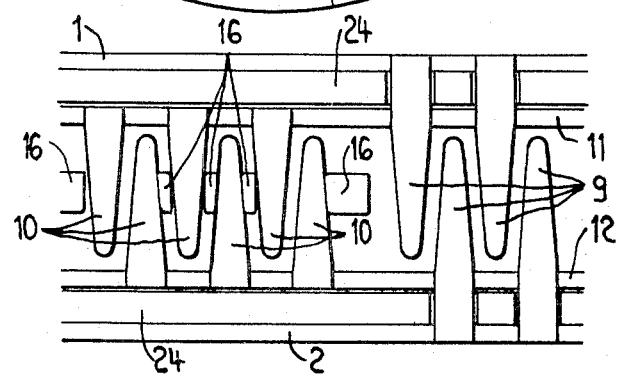
FIG. 3 is a developed view of the stator parts.

The motor comprises a stator housing made of sheet iron and including a pot-shaped member 1 and a cover 2 riveted thereto. Inserted in this housing is a coil assembly 3 in which the coil 4 is injection moulded into a part 5. The coil assembly 3 has a radial boss 6 extending through a window 7 in the stator member 1 and holds terminals 8 which are also moulded into the part 5. As shown in FIG. 2, the boss 6 is located in the window 7 and has limited circumferential movement therein.

As partially indicated in FIG. 2, main pole teeth 9 extend from the housing members 1 and 2 which form parts of the stator, said teeth being bent so as to be axially parallel. They form two diametrically opposed groups. Two groups of auxiliary poles 10 are disposed between them with a flux therein phase-shifted through the angle $\phi$. The parts 11 and 12 of the stator forming the auxiliary poles 10, have a hole in their centres and can rotate on the hubs 13 and 14 which are of soft iron. The parts 11 and 12 of the stator, both of which are identical, are secured to each shoulder of the hub by means of cup springs 15. Moulded on the inside of the coil assembly 3 are cams or teeth 16, engaging between the auxiliary poles 10 and to effect a rigid coupling of the two stator parts 11 and 12 together and to the coil assembly. The shape of the auxiliary poles 10, tapering towards their free ends and rounded, facilitates their insertion between the studs 16. The stator parts 11 and 12 are thus held in fixed positions relatively to each other and cannot be subjected to relative angular displacement, but can be turned on the hubs 13 and 14 jointly together with the coil assembly 3. The angle of rotation amounts electrically to 2 $\phi$. The end positions are determined by the engagement of a boss 17 on an arm 18 of the coil assembly 3, in either of two windows 19 of the housing member 1. The two hubs 13 and 14 are disposed on bushes 20 and 21 which are riveted to the housing members 1 and 2, of which the bush 21 provides two bearings for the shaft 22 and the rotor 23 disposed thereon. The rotor has permanent magnetic poles. The hubs 13 and 14 are enclosed by short-circuit rings 24 which effect the flux displacement in the auxiliary poles 10.

Figure 1:
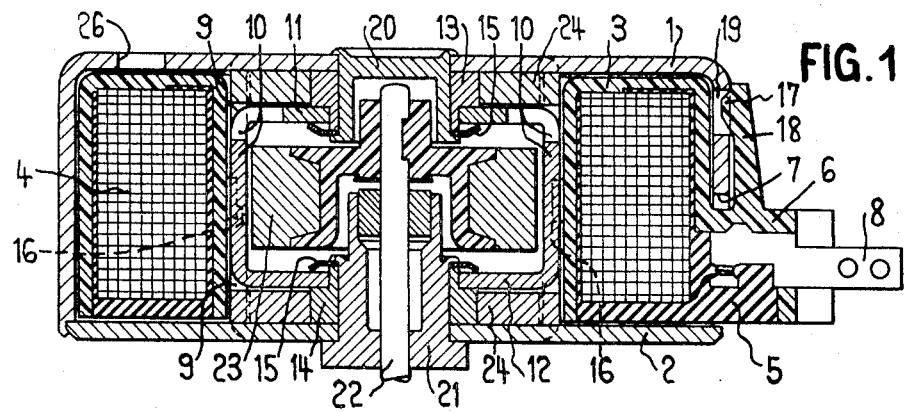

The operation of the motor corresponds to that of conventional synchronous motors of this kind. The relative positions of the main and auxiliary poles and the direction of phase shift of the auxiliary flux determines the running direction of the rotor. As shown in FIGS. 1 and 2, this direction of rotation is indicated by arrows 25 which are moulded on the coil assembly and one of which is visible in an opening 26 of the housing member 1, according to the position of the coil and the stator members 11 and 12. By turning the coil and the stator members coupled thereto, it is possible to change the direction of rotation. The extension 6 of the coil assembly serves as a handle for this purpose whilst the cam 17 accurately determines the particular operating position.

Several alternative embodiments are possible. The edges on the window 7 of the stator member 1 may serve as stops for the extension 6 of the coil assembly in order to determine the end position associated with each direction of rotation. The rotatability of the coil and one member of the stator may simultaneously provide fine adjustment of the most favourable pole position, so that an optimum position for quiet running or for maximum torque may be selected for each direction of rotation.

Adjustment may be facilitated by auxiliary members, e.g. by parts provided on the stator members 1 or 2 and/or on the coil assembly 3, and capable of being bent out, e.g. punched out metal lugs, which members may also serve to secure the coil assembly or the rotatable stator members in any desired position.

The adjustment of the stator poles relatively to the change in the direction of rotation has been described as 2 $\phi$, but FIG. 2 shows that the auxiliary pole 10 can be displaced out of the position shown e.g. either through the angle 2 $\phi$ in a clockwise direction or through the angle $360° - 2\phi$ in an anti-clockwise direction in order to change the direction of rotation.

The bush 20 may consist of bearing material and serve simultaneously as a step bearing for the rotor shaft. In addition, it would be possible to construct each of the parts 20 and 13 or 21 and 14 integrally of sintered iron.

The drawings show a preferred embodiment with a coil which is co-axial to the rotor and coupled to the adjustable stator members. An alternative embodiment would also be possible, in which the coil is not co-axial and/or not jointly rotatable, and in which the adjustable stator members are coupled together in some manner, for example, by means of enlarged pole portions or by means of a coupling member engaging between the poles. An adjusting member of a stator may project in this case through slots in the short circuit ring 24 and in the stator part 1 or 2 in order to adjust the movable parts of the stator.

Instead of designing the stator members in the manner shown, with radial flanges mounted on the hubs 14 and 20, it would also be possible to allow the poles of these stator members to extend through the short-circuit discs in such manner as to be in contact with the stator part 1 or 2. A pole could be extended outwardly and serve as an adjusting member. The short circuit rings could be made rotatable and be used as axial supports for the adjustable stator members.

Instead of the method of indicating the direction of rotation by means of arrows, as shown, a letter R or L or another sign giving the direction of rotation could appear in the opening 26. Corresponding signs could also be visible in other positions, e.g. through an open end of the window 7.

What we claim is:

1. A synchronous motor the stator of which is provided with main poles and auxiliary poles the flux of which being dephased through an angle $\phi$ for determining the direction of rotation, all the poles of one kind being capable of being jointly displaced through twice the phase angle $\phi$ of the flux of the auxiliary poles, relatively to the other kind of poles, to preselect the direction of rotation, wherein the displaceable poles are arranged on stator members coupled mechanically together, said stator members being rotatable co-axially with the rotor shaft in a stator housing carrying the rotor bearings and coupled to a common adjusting member accessible from outside the stator housing.

2. Motor according to claim 1 in which the coil and rotor are arranged co-axially and comprise stator main and auxiliary poles engaging between the coil and the rotor, wherein the rotatable stator members are rotatable with the coil.

3. A motor according to claim 2, wherein two rotatable stator members with opposed poles are mechanically coupled by means of the coil assembly.

4. A motor according to claim 3, wherein the coil assembly is provided on its inner side with teeth engaging between the stator poles of the stator members coupled therewith.

5. A motor according to claim 1, wherein the rotatable stator members have radially extending flanges to which axially bent poles are connected.

6. A motor according to claim 5, wherein the flanges of the rotatable stator members are rotatably supported on hubs, each of which projects inwardly from one end wall of the housing.

7. A motor according to claim 6, wherein the hubs are each enclosed by respective short-circuited rings disposed between one end wall of the housing and one rotatable stator member.

8. A motor according to claim 3, wherein the coil assembly is provided with a catch for determining the particular operating position of the coil and the members of the stator connected thereto.

9. A motor according to claim 8, wherein the coil assembly is provided with an arm having a boss engaging in the window of the housing.

10. A motor according to claim 1, including signs on and displaceable with the rotatable stator members for indicating the direction of rotation.

11. A motor according to claim 10, wherein arrows indicating the directions of rotation are moulded on the coil assembly and are visible from outside through an opening.

12. A motor according to claim 1, wherein the coil assembly is provided with a boss extending through a window of a stator member the boss having terminals for the coil.

13. A motor according to claim 12, wherein the boss determines the operating positions of the coil assembly and the stator members rotatable therewith, by contact with the ends of the window.

* * * * *

UNITED STATES PATENT OFFICE
CERTIFICATE OF CORRECTION

Patent No. 3,800,175  Dated March 26, 1974

Inventor(s) Hans Plotscher and Hermann Gerber

It is certified that error appears in the above-identified patent and that said Letters Patent are hereby corrected as shown below:

IN THE HEADING:

Change address of Assignee to: SAIA A.G. Fabrik elektrischer Apparate, Murten, Fribourg Canton, Switzerland Signed and sealed this 22nd day of October 1974.

(SEAL)
Attest:

McCOY M. GIBSON JR.
Attesting Officer

C. MARSHALL DANN
Commissioner of Patents